Figure 1:
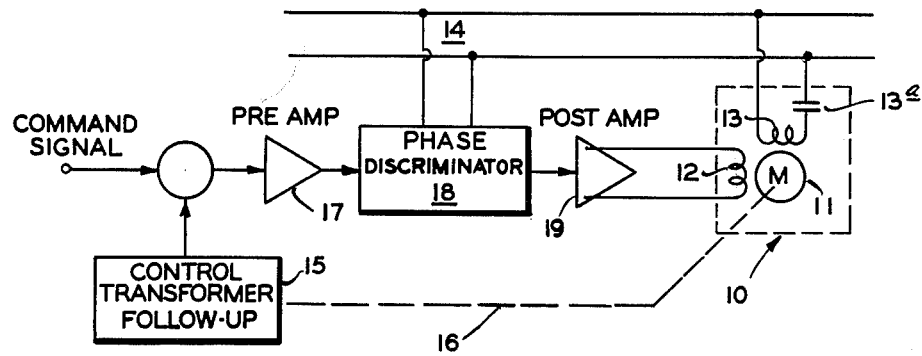

Nov. 20, 1962     J. E. BROOK     3,065,361

PHASE DISCRIMINATOR

Filed Aug. 13, 1959

INVENTOR.
JAMES E. BROOK
BY
ATTORNEY

United States Patent Office 3,065,361
Patented Nov. 20, 1962

3,065,361
PHASE DISCRIMINATOR
James E. Brook, Maywood, N.J., assignor to The Bendix Corporation, a corporation of Delaware
Filed Aug. 13, 1959, Ser. No. 833,523
10 Claims. (Cl. 307—88.5)

This invention relates to phase discriminators and more particularly to phase discriminators for use in servo systems where it is important to discriminate against quadrature signal voltages.

A quadrature voltage appearing with a command signal will adversely affect the operation of a servomotor and particularly a two-phase servomotor, since heat will be produced rather than useful torque. In a two-phase servo system the voltage applied to the variable phase must be 90 degrees out of phase with the voltage applied to the fixed phase to produce motor torque. A quadrature voltage appearing with the signal applied to the variable phase will, therefore, actually be in phase with the voltage fed to the fixed phase so that a useful torque will not be produced in the servomotor. This problem is complicated by the fact that in actual practice servomotors will respond in a small degree to a quadrature signal, the effect being known as "single phasing." In a servo system, a small quadrature voltage combined with an error signal will result in a small error in the null position of the servomotor. However, as the error signal becomes smaller with respect to the quadrature voltage a point is reached, near the final null position, when the system becomes indeterminate due to the servomotor responding to the quadrature voltage. This condition is aggravated by the fact that the quadrature voltage is identical with the error signal in every respect except phase angle and, since the servomotor drives only to eliminate the error voltage, it is impossible for the servomotor to eliminate the quadrature component. The servo amplifier is also affected since it cannot recognize any distinction between the quadrature voltage and the error signal being fed to the variable phase of the servomotor and hence will amplify and pass a combined signal which overloads the amplifier and reduces the capacity of the servomotor to null. It is imperative therefore that the quadrature voltage be eliminated from the signal applied to the variable phase of the servomotor.

In this invention there is disclosed a novel phase discriminator particularly adapted for use in a servo system for eliminating the quadrature voltage. The novel phase discriminator disclosed herein comprises first input means for receiving a variable signal having an unwanted quadrature component, second input means for receiving a reference voltage, pulse generator means responsive to the reference voltage for generating pulses at the minimum slope of the reference voltage, and gating means for passing the variable signal when energized by the pulses from the pulse generator means to produce an output signal substantially free of the quadrature component.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Figure 2:
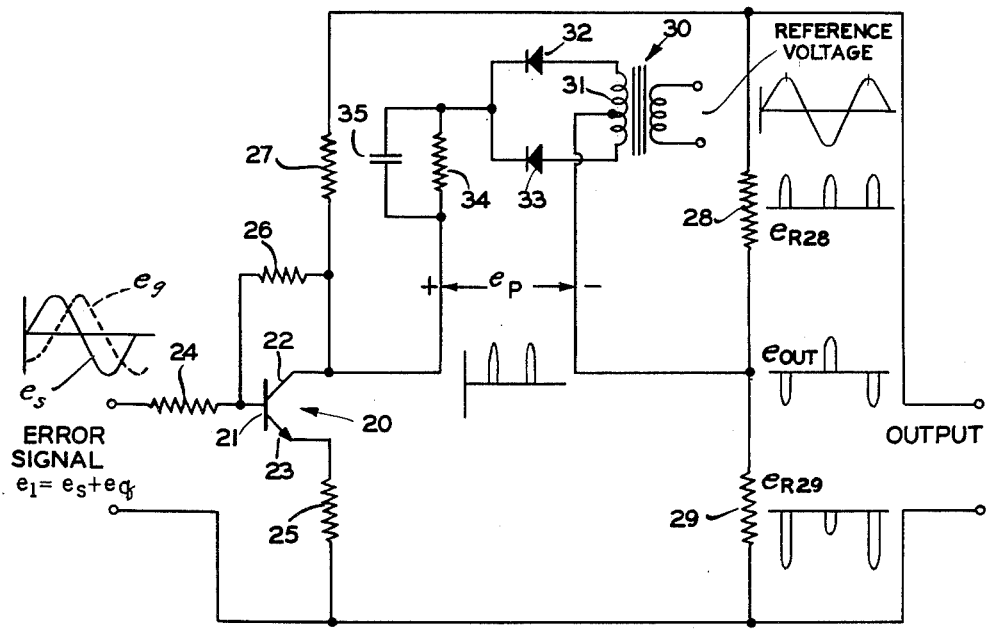

In the drawing:

FIGURE 1 is a block diagram of a servo system including a novel discriminator constructed according to the invention, and FIGURE 2 is a schematic diagram of the novel discriminator illustrating a preferred embodiment of the invention.

Referring now to FIGURE 1, there is shown a two-phase motor 10 having an armature 11, a variable phase winding 12 and a fixed phase winding 13. The movement of armature 11 is controlled by energizing variable phase winding 12 and fixed phase winding 13 with voltages 90 degrees out of phase with one another. Fixed phase winding 13 is connected to a reference supply 14 through a capacitor 13a to provide a 90 degree phase shift. Variable phase winding 12 is energized by a variable output signal from an amplifier 19.

In the normal operation of motor 10, movement of armature 11 operates a control transformer 15 through a mechanical linkage 16. Control transformer 15 provides a follow-up signal, corresponding to the position of armature 11. A command signal from any suitable source, not illustrated, is algebraically combined with the follow-up signal to provide an error signal which may include an unwanted quadrature voltage. The error signal is applied to a preamplifier 17 and then to a novel phase discriminator 18 constructed according to the invention which eliminates the quadrature voltage. Phase discriminator 18 is connected to reference supply 14 and produces a variable output signal free of quadrature voltage and having an amplitude and phase corresponding to the amplitude and phase of the usable portion of the error signal. The output of phase discriminator 18 is fed to amplifier 19 connected to variable phase 12 of motor 10.

The novel phase discriminator 18 shown in block form in FIGURE 1 is shown in schematic form in FIGURE 2. The error signal $e_1$ applied to the input of phase discriminator 18 includes a usable portion of the signal $e_s$ and an unwanted quadrature voltage $e_q$, both of which are illustrated as sine waves. The error signal is applied to a transistor circuit comprising a NPN transistor 20 having a base element 21, a collector element 22 and an emitter element 23. The circuit is arranged to have the error signal developed across the base and emitter elements by means of resistors 24 and 25 connected in series with the base and emitter elements, respectively. A compensating resistor 26 is connected between base element 21 and collector 22 in the normal manner so as to provide feedback for stabilizing the operation of transistor 20.

In the preferred embodiment, the phase discriminator comprises a bridge circuit with the transistor circuit as the first leg of the bridge and with substantially fixed impedances 27, 28 and 29, illustrated as resistors, as the second, third and fourth legs, respectively. The output signal appears across resistors 28 and 29. The waveforms illustrated in FIGURE 2 represent the voltages appearing across the various components when the usable portion $e_s$ of the error signal is in-phase with the reference voltage.

As illustrated in FIGURE 1, phase discriminator 18 is also connected to the same reference supply 14 as fixed phase 13 of motor 10. The reference supply is a sinusoidal voltage which is applied to a pulse generator comprising a full wave rectifier circuit including a power transformer 30 having a center-tapped secondary winding 31 and a pair of unilateral conducting members 32 and 33, illustrated as diodes, connected in series with winding 31. The output ends of the diodes are connected together to one end of a parallel combination of a load resistor 34 and a capacitor 35, the other end of the combination being connected to collector element 22 of transistor 20.

The center-tap on winding 31 is connected to the junction of resistors 28 and 29. The rectified signal $e_p$ is a series of pulses synchronous with the minimum slope of the reference voltage. It will be observed that pulses $e_p$ are applied across the second and third fixed impedance legs comprising resistors 27 and 28 respectively, and across variable impedance first leg and fixed impedance fourth leg comprising the transistor circuit and fixed impedance 29. The output signal is developed as a summation of the voltages across resistors 28 and 29 which represent legs three and four of the bridge circuit.

The theory of operation of the discriminator is based on the synchronous sampling of the input error signal during a small part of the carrier period and at a time when the quadrature voltage present in the error signal is passing through zero amplitude. The D.C. voltage accumulated across capacitor 35 reduces the firing angle (in electrical degrees) of the diodes 32 and 33 thereby generating the pulses $e_p$ when the reference voltage is of minimum slope. The pulses $e_p$ cause transistor 20 to conduct current only during minimum slope of the error signal and when the quadrature voltage present in the error signal is passing through zero amplitude. It will be apparent that at zero slope of the error signal the quadrature voltage is substantially linear thereby resulting in equal portions of negative and positive quadrature signals being included with the generated pulse. Since this sampling takes place on the linear portion of the quadrature voltage curve substantially equal negative and positive portions of the quadrature voltage are added to the pulse resulting in a high order harmonic component which may be cancelled out by suitable filters in amplifier 19. Since the normal servomotor will not respond to the higher order harmonics, the efficiency of quadrature rejection can be increased by reducing the width of the sampling pulse.

In the network comprising resistors 27 and 28 with a voltage $e_p$ applied as described the voltage developed across resistor 28 is:

$$e_{R_{28}} = -e_p\left(\frac{R_{28}}{R_{27}+R_{28}}\right) \quad (1)$$

In the circuit comprising resistor 29, the transistor 20 and resistor 25 with a voltage $e_p$ applied as described the voltage across resistor 29 is in the approximate functional form:

$$e_{R_{29}} = -e_p\left(\frac{R_{29}}{(R_0+R_{25})+R_{29}}+Ke_1\right) \quad (2)$$

where $R_0$ is the collector to emitter resistance of the transistor when the error signal $e_1=0$, and K is related to the current gain constant beta. The voltage output is:

$$e_{out} = e_p\left(\frac{R_{28}}{R_{27}+R_{28}}\right) - e_p\left(\frac{R_{29}}{(R_0+R_{25})+R_{29}}+Ke_1\right) \quad (3)$$

When $e_1=0$, $R_{27}$ is chosen so that:

$$\frac{R_{28}}{R_{27}+R_{28}} = \left(\frac{R_{29}}{(R_0+R_{25})+R_{29}}\right) \quad (4)$$

The output reduces to:

$$e_{out} = -e_p Ke_1 \quad (5)$$

In Equation 5 it is seen that the instantaneous value of $e_{out}$ is a product of $e_p$ and $e_1$ and the constant K and that in the absence of $e_1$ there will be a zero signal output. Since $e_p$ is a fractional sine wave of large constant peak amplitude and $e_1$ is a complete sine wave of small amplitude, then the functional character, or waveform, of $e_{out}$ is dominated by $e_p$ and the amplitude of $e_{out}$ is linearly controlled by $e_1$.

Considering now an error signal being in phase with the reference signal as illustrated, it will be apparent that signal $e_p$ will develop a voltage across resistor 28 shown as $e_{R_{28}}$. The signal across resistor 29 will be the combination of the error signal and $e_p$ and is illustrated as $e_{R_{29}}$. The output signal is the combination of the voltage across resistor 28 and resistor 29 and is illustrated as $e_{out}$. In considering the out-of-phase condition between the error signal and the reference signal, it will be apparent that the indicated polarity of $e_{out}$ will be reversed thereby driving servomotor 14 in the opposite direction.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A phase discriminator comprising an input for receiving a variable signal, a pulse generator responsive to a reference voltage and comprising a full wave rectifier circuit feeding a parallel combination of a load impedance and a capacitor for generating pulses at the minimum slope of the reference voltage, and gating means connected to the input and to the pulse generator for passing the variable signal only when energized by the pulses from the pulse generator to produce an output signal.

2. A pulse discriminator comprising an input for receiving a signal having a usable portion and an unwanted quadrature component, a pulse generator responsive to a reference voltage and comprising a full wave rectifier circuit connected to a parallel combination of a load impedance and a capacitor for generating pulses at the minimum slope of the reference voltage, and gating means connected to the input and to the pulse generator for passing the variable signal only when energized by the pulses from the pulse generator to produce an output substantially free of the quadrature component.

3. A phase discriminator comprising a bridge circuit having a variable impedance leg energized by a variable signal having a usable portion and an unwanted quadrature component and three substantially fixed impedance legs, a pulse generator connected to the bridge circuit across two of the fixed impedance legs and across the variable impedance leg and the third fixed impedance leg and responsive to a reference voltage for generating pulses at the minimum slope of the reference voltage for pulsing the variable signal to provide an output across one of said two fixed impedance legs and the third fixed impedance leg substantially free of the quadrature component.

4. A phase discriminator comprising a bridge circuit having a transistor operated variable impedance leg energized by a variable signal having a usable portion and an unwanted quadrature component and three substantially fixed impedance legs, a pulse generator connected to the bridge circuit across two of the fixed impedance legs and across the variable impedance leg and the third fixed impedance leg and responsive to a reference voltage for generating pulses at the minimum slope of the reference voltage for pulsing the variable signal to provide an output across one of said two fixed impedance legs and the third fixed impedance leg substantially free of the quadrature component.

5. A phase discriminator comprising a bridge circuit having a variable impedance leg and three substantially fixed impedance legs, means for applying to the variable impedance leg a signal having a usable portion and an unwanted quadrature component, a pulse generator responsive to a reference voltage and comprising a full wave rectifier circuit and a parallel combination of a load impedance and a capacitor for generating pulses at the minimum slope of the reference voltage, said pulse generator being connected to the bridge circuit across two of the fixed impedance legs and across the variable impedance leg and the third fixed impedance leg to provide an output across one of the two fixed impedance legs and the third fixed impedance leg substantially free of the quadrature component.

6. A phase discriminator comprising a bridge circuit having a variable impedance leg and three substantially fixed impedance legs, means for applying to the variable impedance leg a signal having a usable portion and an unwanted quadrature component, a pulse generator responsive to a reference voltage and comprising a full wave rectifier circuit having a center-tapped output transformer connected to a pair of unilateral conducting members and a parallel combination of a load impedance and a capacitor for generating pulses at the minimum slope of the reference voltage, said pulse generator being connected to the bridge circuit across two of the fixed impedance legs and across the variable impedance leg and the third fixed impedance leg to provide an output across one of the two fixed impedance legs and the third fixed impedance leg substantially free of the quadrature component.

7. A phase discriminator comprising a bridge circuit having a variable impedance leg and three substantially fixed impedance legs, means for applying to the variable impedance leg a signal having a usable portion and an unwanted quadrature component, pulse generator means responsive to a reference voltage for generating pulses at the minimum slope of the reference voltage and connected to the bridge circuit across two of the fixed impedance legs and across the variable impedance leg and the third fixed impedance leg to provide an output across one of the two fixed impedance legs and the third fixed impedance leg substantially free of the quadrature component.

8. In a servo system for controlling the direction and speed of rotation of a two-phase servomotor, a phase discriminator comprising a bridge circuit having a variable impedance leg and three substantially fixed impedance legs, means for applying a signal having a usable portion and an unwanted quadrature component to the variable impedance leg, a pulse generator responsive to a reference voltage for generating pulses at the minimum slope of the reference voltage and connected to the bridge circuit across two of the fixed impedance legs and across the variable impedance leg and the third fixed impedance leg to provide an output across one of the two fixed impedance legs and the third fixed impedance leg substantially free of the quadrature component.

9. A phase discriminator comprising an input for receiving a variable signal, a pulse generator responsive to a reference voltage and comprising a full wave rectifier circuit feeding a parallel combination of a resistance and a capacitor for generating pulses at the minimum slope of the reference voltage, and means including a transistor connected to the input and to the pulse generator for passing the variable signal only when energized by the pulses from the pulse generator to produce an output signal.

10. A phase discriminator comprising an input for receiving a signal having a usable portion and an unwanted quadrature component, a pulse generator responsive to a reference voltage and comprising a full wave rectifier circuit connected to a parallel combination of a resistance and a capacitor for generating pulses at the minimum slope of the reference voltage, means including a transistor connected to the input and to the pulse generator for passing the variable signal only when energized by the pulses from the pulse generator to produce an output substantially free of the quadrature component.

References Cited in the file of this patent

UNITED STATES PATENTS

| | | |
|---|---|---|
| 2,633,019 | Albrecht et al. | Mar. 31, 1953 |
| 2,833,918 | Knox | May 6, 1958 |
| 2,881,379 | Logan | Apr. 7, 1959 |
| 2,886,764 | Zelina | May 12, 1959 |
| 2,914,682 | Taylor | Nov. 24, 1959 |

OTHER REFERENCES

"Electronic and Radio Engineering," by Terman, 4th Edition, McGraw-Hill Book Co., Inc., 1955, page 711 cited.